Nov. 20, 1962 R. E. FRUSHOUR ET AL 3,064,540
MACHINE TOOLS
Filed July 24, 1958 6 Sheets-Sheet 1

Inventors
Russel E. Frushour
Otto A. Costello
Stephen E. Farekas
Wayne B. Irish
By Mann, Brown & McWilliams
Attorneys Nov. 20, 1962 R. E. FRUSHOUR ET AL 3,064,540
MACHINE TOOLS
Filed July 24, 1958 6 Sheets-Sheet 2
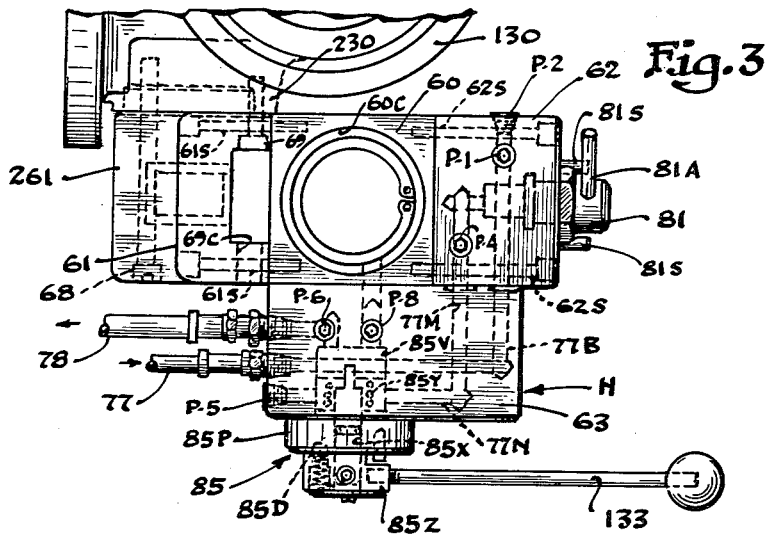
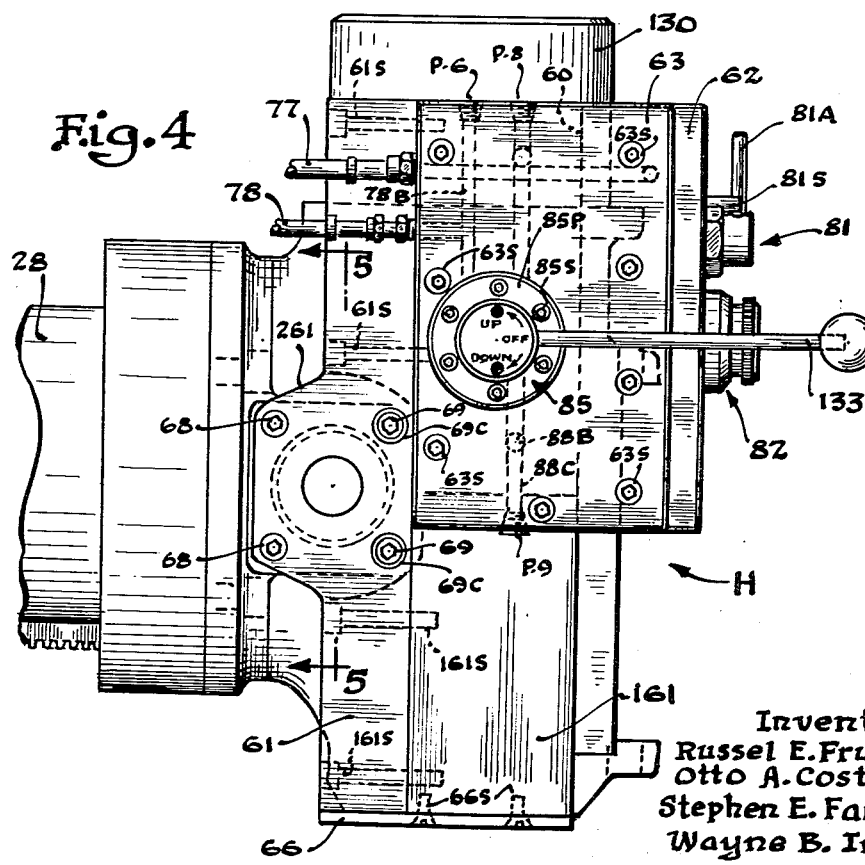
Inventors
Russel E. Frushour
Otto A. Costello
Stephen E. Farekas
Wayne B. Irish
By Mann, Brown & McWilliams
Attorneys Inventor
Russel E. Frushour
Otto A. Costello
Stephen E. Farekas
Wayne B. Irish
By Mann, Brown & McWilliams
Attorneys

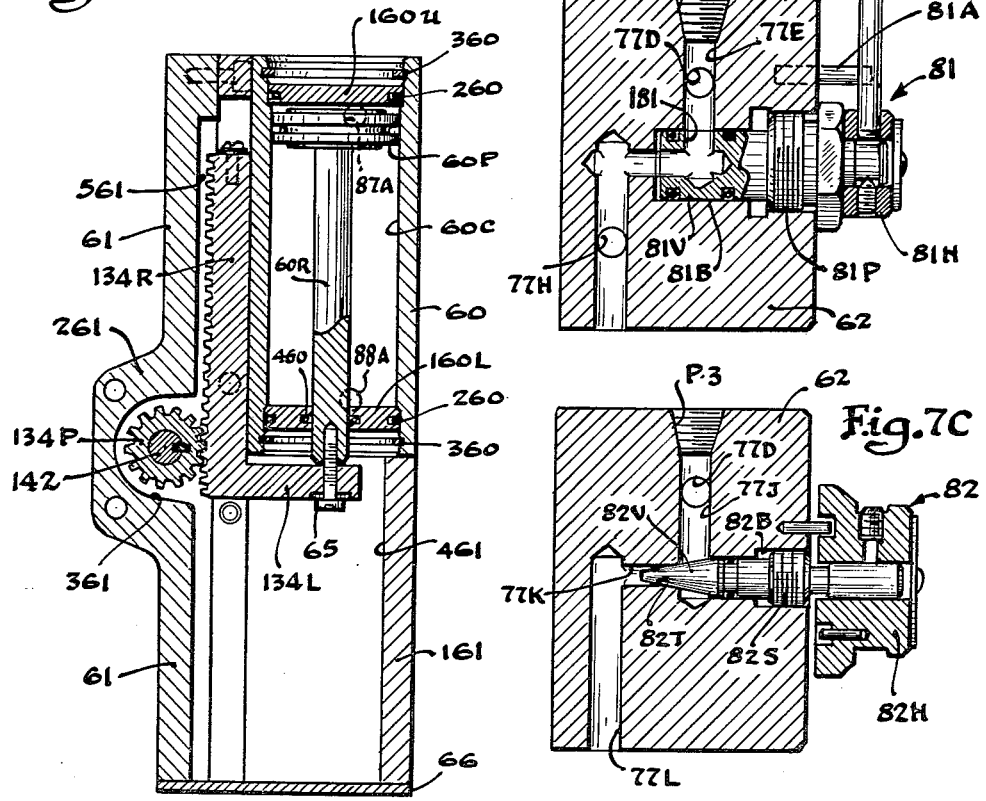
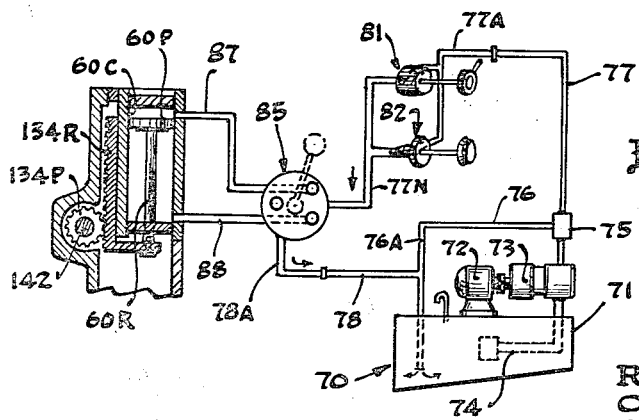

Inventors
Russel E. Frushour
Otto A. Costello
Stephen E. Farekas
Wayne B. Irish
By Mann, Brown & McWilliams
Attorneys

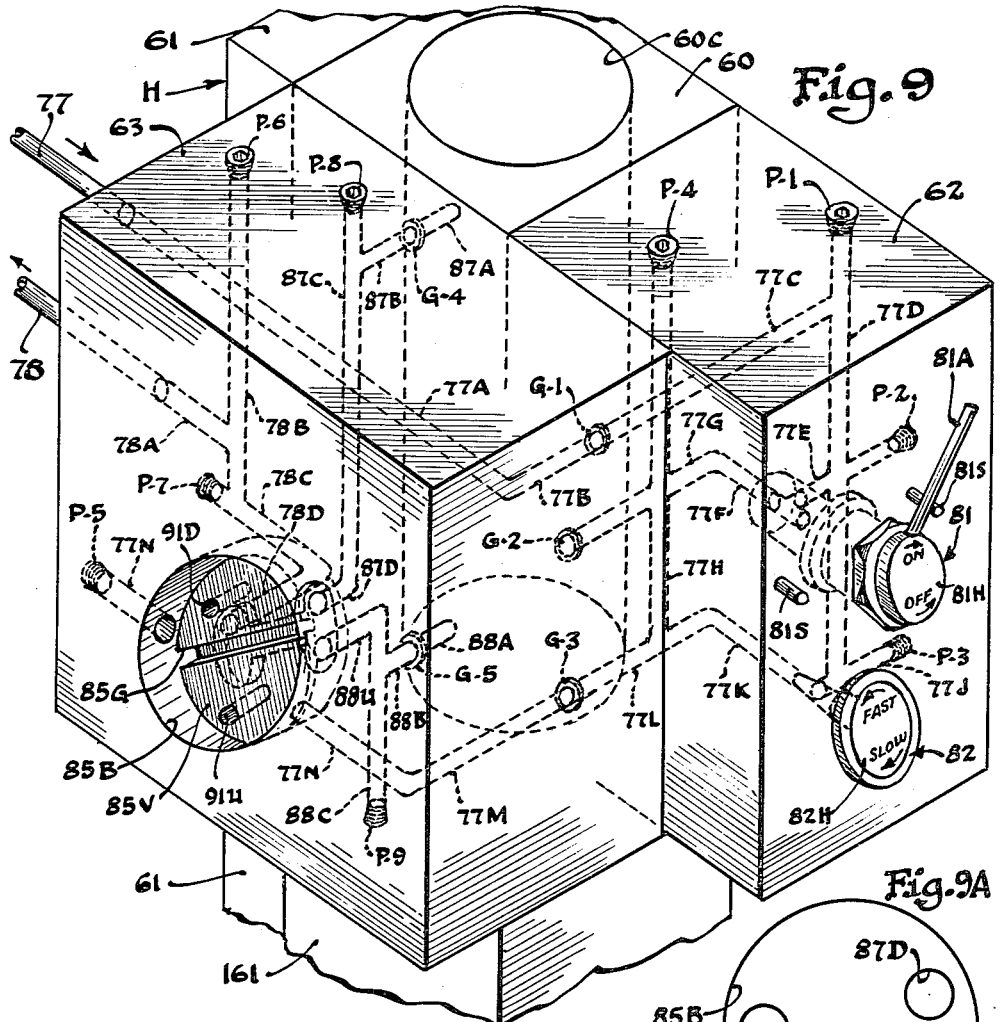

United States Patent Office 3,064,540
Patented Nov. 20, 1962

3,064,540
MACHINE TOOLS
Russel E. Frushour, Niles, Mich., and Otto A. Costello, Stephen E. Farekas, and Wayne B. Irish, South Bend, Ind., assignors, by mesne asignments, to Amsted Industries Incorporated, Chicago, Ill., a corporation of New Jersey
Filed July 24, 1958, Ser. No. 750,810
7 Claims. (Cl. 90—14)

This invention relates to machine tools and particularly to a hydraulic reciprocable quill in such machine tools.

In machine tools such as vertical milling machines and in drilling machines, it is usual practice to mount the tool carrying spindle in a reciprocable quill and to provide manual actuating means for reciprocating the quill. Such manual actuating means usually takes the form of a rack and pinion with the rack formed on the quill and the pinion disposed on a transverse operating shaft which has an external actuating handle that is rocked in opposite directions to correspondingly actuate the quill.

The present invention is concerned with the hydraulic actuation of a quill structure of the aforesaid character, and the primary object of the present invention is to provide hydraulic actuating mechanism that may be readily associated with the quill of a machine tool for actuating the same, and a related object is to provide such a hydraulic actuator that may be readily assocaited with such a manually operable quill in such a manner that the quill may be operated either by the hydraulic mechanism or by the manually operated means.

Another and more specific object of the present invention is to provide hydraulic quill actuating mechanism that may be readily associated with a machine tool where the quill has manual operating means of the aforesaid character, and a further and related object is to provide a hydraulic unit that embodies the hydraulic actuator as well as the control means for such actuator.

In providing for hydraulic actuation of a machine element in opposite directions, a two-way reversible type of actuating means such as a piston and cylinder is required, and in such means there is a normal tendency to lock the actuator in a particular position to which it has been moved, and a further and more specific object of the present invention is to provide a control for an actuator of the aforesaid character whereby the hydraulic actuator may be operated at will in either direction, and which nevertheless provides for manual actuation of the machine element when the control is in its neutral position.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 3 is a plan view of the hydraulic actuating mechanism in position on the machine;

FIG. 4 is a side elevational view of the hydraulic mechanism as applied to the machine;

FIG. 7 is a vertical sectional view taken substantially along the line 7—7 of FIG. 5;

FIG. 7A is a schematic view of the hydraulic system;

FIG. 7B is a plan sectional view through the rapid feed valve;

FIG. 7C is a plan sectional view through the rate adjustment valve;

FIG. 9 is a schematic perspective view illustrating the hydraulic circuits and control means of the hydraulic actuator;

FIG. 9A is a view of the bottom of the valve chamber of the direction control valve, and FIGS. 10 and 11 are front views of a schematic perspective showing the direction control valve of the hydraulic mechanism in different set positions.

Figure 2:
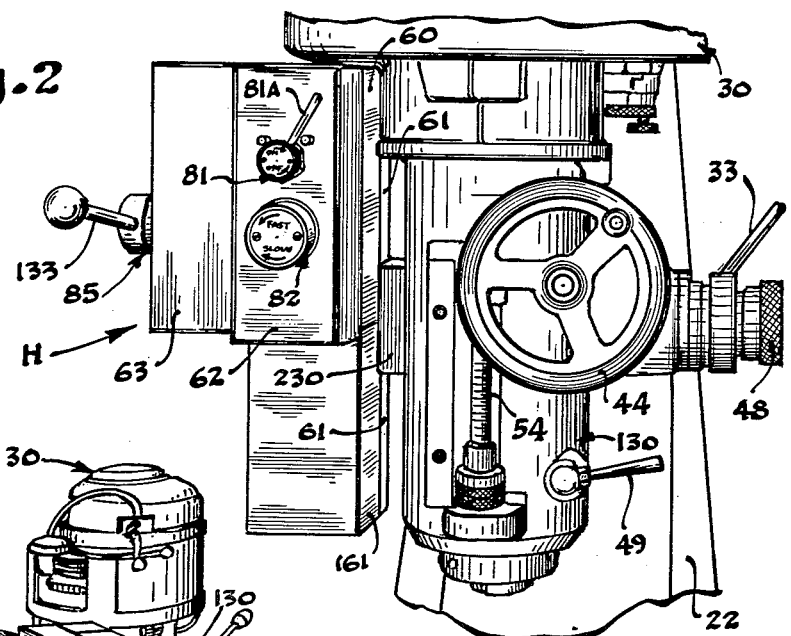
FIG. 2 is a fragmentary perspective view of an upper portion of the machine, the view being taken at a slightly different angle and at an enlarged scale.

For purposes of disclosure the invention is herein illustrated in a vertical milling machine 20 which has a base 21 with an upstanding column 22. On the forward face of the column 22 a knee 23 is mounted for vertical adjustment along vertical ways 23W that are provided on the column 22, and the knee may be adjusted by means including a vertical adjusting screw 23S and an adjusting handle 23H.

On the knee 23 a saddle 24 is mounted for adjustment horizontally toward and away from the column 22 along ways 24W that are provided in the knee 23, and such adjustment is accomplished by means including an adjusting hand wheel 24H that is disposed at the forward side of the knee 23.

The saddle 24 carries an elongated table 25 that is longitudinally adjustable along the saddle 24 in a horizontal direction and perpendicular to the path of adjustment of the saddle 24, and this longitudinal adjustment or positioning of the table 25 is accomplished by either one of the two hand wheels 25H that are located at opposite ends of the table 25.

At the top of the column 22, an over arm-support or ram-support 122 is secured, and in the support 122 a ram 28 is mounted so as to be substantially above the highest level of the table 25. The ram 28 is mounted for horizontal adjustment perpendicular to the path of adjustment of the table 25, and at the forward end of the ram 28, a head 30 is mounted for adjustment to different rotative positions about the axis of the ram in a conventional manner. The head 30 may be adjusted to different positions transversely of the table 25 by longitudinal adjustment of the ram 28 upon which the head 30 is carried.

The head 30 houses the tool driving means in its upper head portion, and this driving means serves to operate a tool carrying spindle 32 which is rotatably mounted in a depending housing section 130 of the head.

Figure 1:
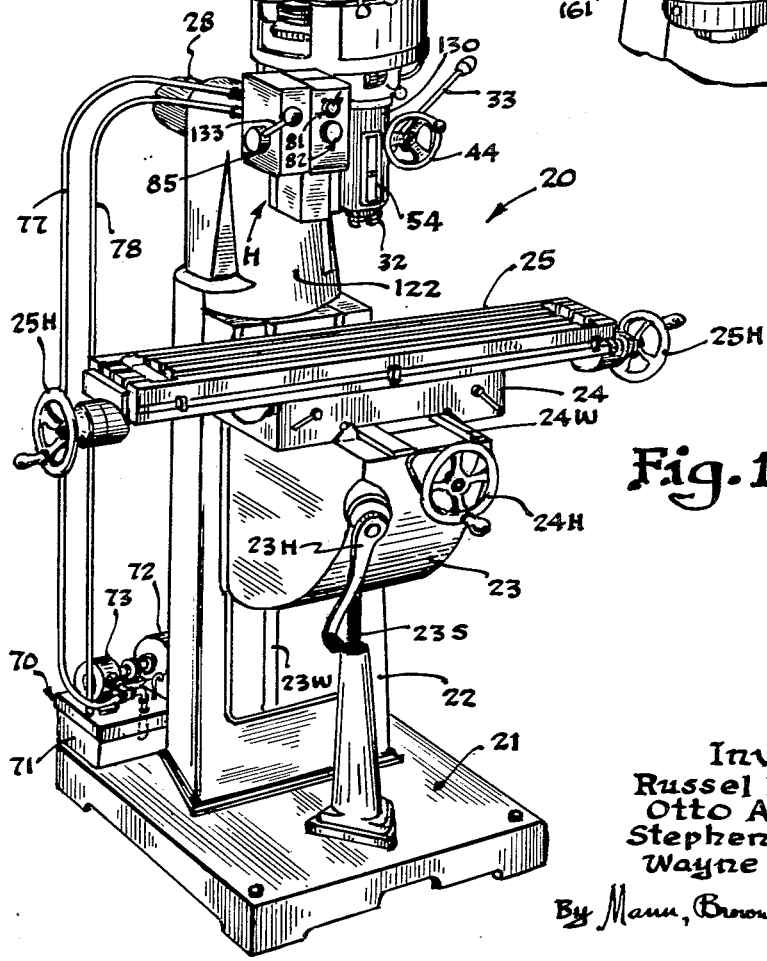
FIG. 1 is a front perspective view of a vertical milling machine embodying the features of the invention.

The tool spindle 32 is mounted in the head 30 in such a way that it may be reciprocated or set longitudinally in the housing 130 so as to thereby enable conventional material-working operations to be performed by a tool that is carried by or mounted on the lower end of the spindle 32, and under the present invention such longitudinal actuation may be accomplished by conventional actuating means such as a manually operable handle 33 located at the right hand side of the head 30, as shown in FIGS. 1 and 2, or by a hydraulic actuating unit H mounted on the other or left hand side of the head 30 under manual control that is exercised by a manual control handle 133.

Figure 8:
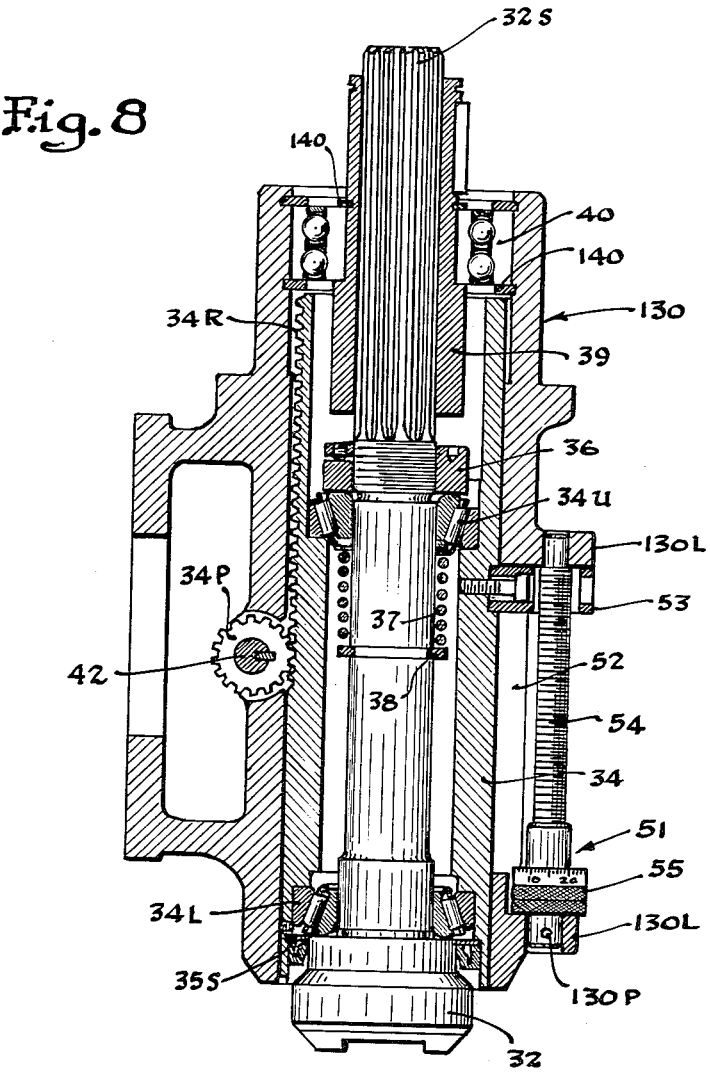
FIG. 8 is a vertical sectional view taken through the vertical axis of the quill substantially along the line 8—8 of FIG. 6.

As shown particularly in FIGS. 5 to 8 of the drawings, the spindle 32 is mounted in the depending housing section 130 of the head 30, and such mounting provides for vertical reciprocation or setting of the spindle 32. Within the housing 130, a tubular quill 34 is mounted for vertical reciprocation, while the spindle 32 is in turn mounted in a fixed longitudinal relationship in and with respect to the quill 34 and for rotation with respect to the quill. As shown in FIG. 8, the quill has a tapered roller bearing 34L shouldered into its lower end with a press fit, and a washer 35S serves as an oil seal during use and as a knockout surface for disassembly. An upper tapered lower bearing 34U is removably located in a mid-portion of the quill 34 and bears against an upwardly facing shoulder. The spindle 32 has an enlarged shoulder facing upwardly near its lower end and this shoulder bears against the inner face of the lower thrust bearing 34L, and the upper thrust bearing 34U surrounds the spindle a substantial distance upwardly from the lower thrust bearing and a nut 36 threaded onto the spindle 32 bears downwardly against the inner race of the upper thrust bearing. An expansion coil 37 acts between a washer 38 and the lower edge of the inner race of the thrust bearing 34U. Thus the spindle 32 is rotatable in the quill and is held against longitudinal displacement therein by the opposed thrust bearings 34U and 34L.

Above the location of the nut 36, the spindle 32 is formed with splines 32S which engage internal splines in an elongated drive sleeve 39 that is supported rotatably in the enlarged upper end of the head section or housing 130 by a bearing 40 that is associated with the sleeve 39 and the head section 130 by means including a plurality of snap rings 140. The sleeve 39 is driven by suitable connection with the spindle drive means that are included within the upper end of the head 30. The quill 34 may be moved up and down within the housing section 130 by manually operable means which include a rearwardly facing rack 34R formed on the outside of the quill 34 and meshed with an operating pinion 34P that is carried on a transverse operating shaft 42 that is shown in FIGS. 5 and 8.

Figure 5:
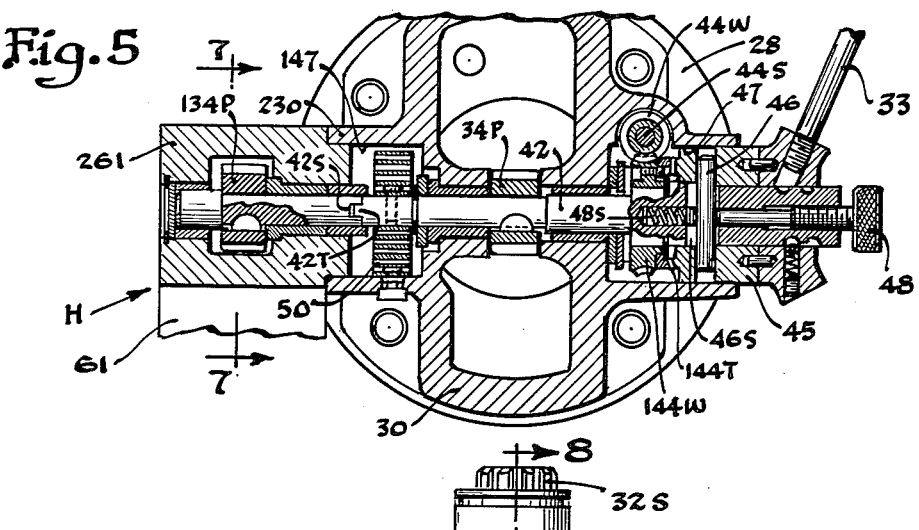
FIG. 5 is a vertical sectional view taken substantially along the line 5—5 of FIG. 4.

The operating shaft 42 may be operated or rotated to raise or lower the quill 34 by means of the forwardly projecting operating handle 33 that is shown in FIGS. 1, 2 and 5 to 8 of the drawings. The handle 33 is located at what may be termed the right hand side of the head 30 and this connection is best shown in FIG. 5 and provides also for connecting of the shaft 42 with a micrometer adjustment means that is actuated by a hand wheel 44 located on the forward side of the housing section 130.

As shown in FIG. 5, the handle 33 is carried on the outer section of a hub 45 and is drivingly connected to the shaft 42 by a transverse pin 46 that extends through the inner section of the hub 45 and engages a transverse slot 46S formed in the shaft 42, and this slot 46S is elongated axially of the shaft 42 so that the hub 45 may be shifted longitudinally of the shaft 42. The hub 45 extends slidably into an enlarged bore 47 formed in the housing 130 on the axis of the shaft 42, and the hub 45 is urged outwardly or to the right of the shaft 42 by means including a spring 48S that is mounted in an axial counterbore formed in the shaft 42. Thus, the hub 45 normally assumes a right hand position as shown in FIG. 5, but may be urged to the left by means of a thumb screw 48 that has its operating head exposed at the end of the shaft 42. This longitudinal adjustment of the hub 45 is utilized in connecting the shaft 42 to the micrometer adjustment means to the shaft 42 when the quill 34 is to be set quite accurately in a desired position of vertical adjustment.

Figure 6:
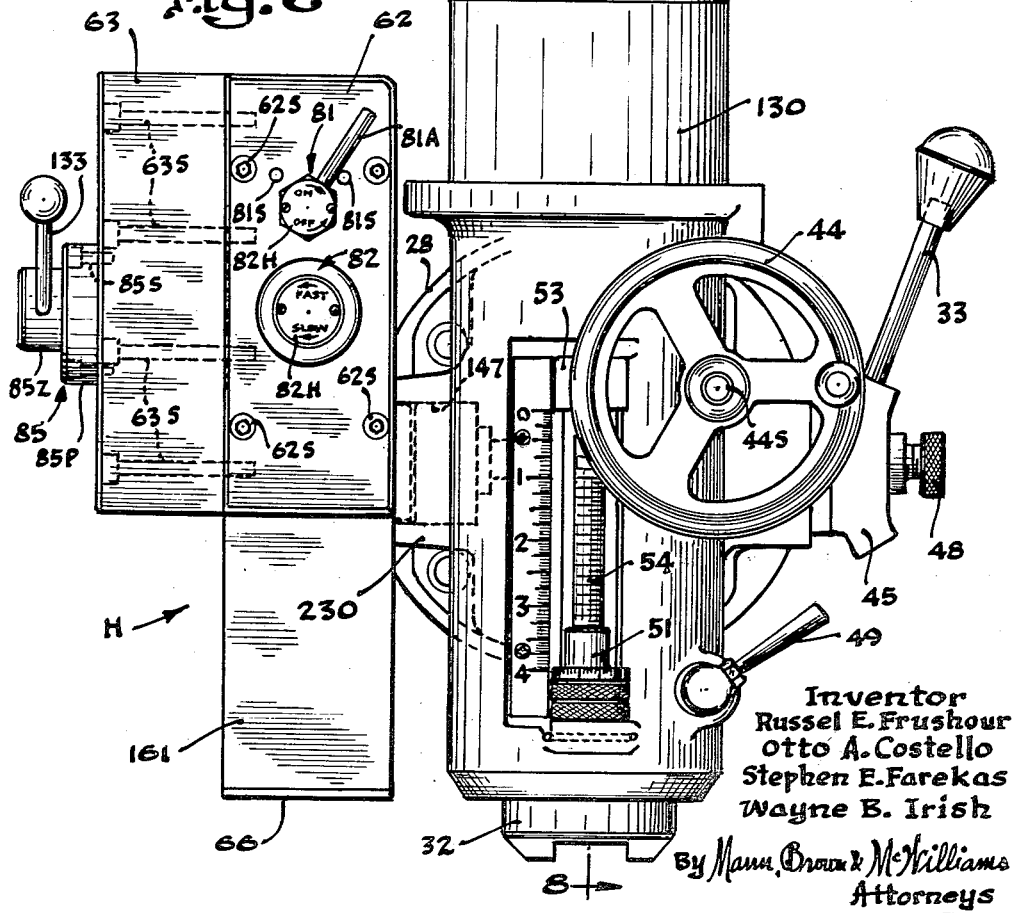
FIG. 6 is a front elevational view of the head of the machine with the hydraulic mechanism in position thereon.

Thus, as shown in FIG. 5, the micrometer adjustment means are provided by mounting the hand wheel 44 on a horizontal shaft 44S that carries a worm 44W thereon, and this worm 44W engages a worm wheel 144W on the shaft 42. The worm wheel 144W is normally free with respect to the shaft 42 and when it is desired to utilize the micrometer adjustment, the hub 45 is actuated to the left by the screw 48 to engage opposite clutch teeth 144T formed respectively on the adjacent sides of the worm wheel 144W and the hub 45. When the micrometer adjustment is utilized to set the quill 34 in a particular position of vertical adjustment, it is usually desirable to lock the quill in the set position, and this may be accomplished by a screw clamping device that is operated by a handle 49, as indicated in FIG. 6 of the drawings.

The other or left hand end of the shaft 42 projects into an enlarged counterbore 147 that is formed in a projecting pad 230 formed on the head 30, and within the housing space that is thus provided by the bore 147, a spiral counterbalance spring 50 is provided with its opposite ends connected, respectively, to the head 30 and the shaft 42. In conventional vertical milling machines and the like, the housing that is provided by the bore 147 is normally closed by a cap plate so that ready access may be had to the counterbalance spring.

When the quill 34 is being actuated by the manual handle 33 or is being actuated hydraulically under the control of the hydraulic unit H, the limit of downward movement may be adjustably set by means of a stop mechanism 51 that is mounted on the forward side of the head section 130. Thus, the head section 130 has a vertical slot 52 formed therein and a stop member 53 that is fixed to the quill 34, as shown in FIGS. 6 and 8, extends outwardly through the slot 52 and surrounds a vertically positioned adjusting screw 54 that is mounted between extending lugs 130L. The screw 54 is fixed against rotation by a pin 130P and an adjustable stop 55 is threaded on the screw 54 so that by adjusting the vertical position of the nut 55 along the screw 54, the lower extent of movement of the quill is determined by engagement of the stop member 53 with the nut 55.

Under and in accordance with the present invention, use is made of the capped bore or chamber 147 in that the usual cap plate is removed and the hydraulic actuating unit H is secured in place opposite the bore 147 and is drivingly connected within the bore 147 with the shaft 42 so that the hydraulic means may function to impart rotative movement to the shaft 42 to raise and lower the quill 34.

The hydraulic unit is best shown in FIGS. 3, 4, 6, 7 and 9 to 11, and in general, the unit H is made up of a number of solid metal blocks that are rigidly connected together by cap screws and which are then secured in position as a unit on the head section 130 against the boss 230 where the control bore 147 is formed. Thus, the hydraulic actuating unit H comprises an elongated cylinder block 60 having a mounting block 61 secured on its rear face, a front valve block 62 secured on the front face of the cylinder block 60, a side valve block 63 secured against what may be termed the left hand side of both the cylinder block 60 and the front valve block 62, as will be evident at FIGS. 3 and 9, and a housing block 161 secured to the forward face of the mounting block 61 below the lower end of the cylinder block 60.

The cylinder block 60 has a vertically extended cylinder 60C formed therein that is initially open at both its bottom and top ends, and a piston 60P is mounted for reciprocation within the cylinder 60C and has a piston rod 60R extending downwardly from the piston through a lower closure plate 160L. The upper end of the cylinder 60C is closed by an upper closure plate 160U, and the closure plates 160U and 160L are generally similar in character and are inserted endwise into slightly enlarged portions of the cylinder 60C and are sealed by means such as O-rings 260. The closure plates 160U and 160L are held in position by internal snap rings 360 as will be evident in FIG. 7 of the drawings. Also, the central opening of the lower closure plate 160L has an O-ring 460 therein to provide a seal about the slidable piston rod 60R.

As will be evident, particularly in FIG. 7 of the drawings, the rear or mounting block 61 which extends downwardly beyond the lower end of the cylinder block 60, while the upper portion of the mounting block 61 extends upwardly along the rear face of the cylinder block 60, has a rearwardly projecting boss portion 261 thereon which provides a housing for a pinion 134P. The pinion 134P is keyed on a transverse stub shaft 142 that is rotatably supported in the rearwardly projecting boss 261, this boss being formed to provide a clearance chamber 361 within which the pinion 134P is located. The stub shaft 142 is drivingly connected with the shaft 42 by a transverse groove 42S that engages a transverse tongue 42T on the shaft 42.

The lower end of the piston rod 60R extends into a vertically extended clearance space 461 that is formed in the housing block 161, and the lower end of the piston rod 60R is connected by means including a screw 65 to a lug 134L that projects from a vertically extended rack 134R. The rack 134R is meshed with the pinion 134P and is guided in a clearance space 561 that is formed between the block 60 and the block 61, such clearance space extending throughout substantially the entire vertical dimension of the mounting block 61. Thus, when the piston 60P is actuated in a downward direction from the position shown in FIG. 7, the rack 134R will be operated so as to rotate the pinion 134P in a clockwise direction. Such clockwise rotation causes downward movement of the quill 34. Similarly, when the piston 60P is actuated in an upward direction so as to return the same to the position shown in FIG. 7, the pinion 134P will be actuated to impart upward movement to the quill 34. The lower ends of the clearance space 461 and the clearance space 561 are preferably closed by a plate such as the plate 66, FIG. 7, that is fastened by screws 66S onto the lower ends of the blocks 61 and 161.

The several blocks that make up the hydraulic unit H are similarly connected together through the use of cap screws extending through certain of the blocks and threaded into opposed surfaces of adjacent blocks. Thus the mounting block 61 is fixed to the cylinder block 60 by a plurality of cap screws 61S that extend forwardly through the mounting block 61 and into the rear face of the cylinder block as will be evident in FIGS. 3 and 4 of the drawings.

The cover block 161 is secured to the mounting block 61 by means of a plurality of cap screws 161S that extend forwardly through the mounting block and are threaded into the rear faces of the cover block 161 adjacent to the vertical side edges thereof, as shown in FIG. 4 of the drawings.

The front valve block 62 is secured in place by a plurality of cap screws 62S that extend rearwardly through the block 62 and are threaded into the front portion of the cylinder block 60.

The side valve block 63 is held in place by a plurality of cap screws 63S that extend through the block 63 and are threaded into the opposed faces of the cylinder block 60 and the front valve block 62, as will be evident particularly in FIGS. 4 and 6 of the drawings.

The hydraulic unit H is thus formed into a rigid unit which is held in place on the head 30 when the mounting block 61 is secured in place, as hereinbefore described.

In the mounting of the hydraulic unit H on the head housing section 130, horizontal screws are extended through the mounting block 61 and its base 261 and into the hub or boss 230 of the head 30, and this arrangement is shown particularly in FIGS. 3 and 4 of the drawings. Thus, a pair of relatively long headed screws 68 are extended horizontally through the mounting boss 261 and into the boss 230 of the head 30, but with respect to the other or forward edge of the mounting block 61, a pair of relatively short mounting screws 69 are employed and these short screws 69 are inserted longitudinally through clearance bore 69C, FIGS. 3 and 4, and through the clearance space 561 and are then extended through the balance of the mounting block 61 and are screwed into the boss 230. The lowermost screw 69 is put in place while the piston 60P is in its upper position, while the uppermost screw 69 is put in place when the piston 60P is in its lowermost position. Such procedure moves the rack 134R to out-of-the-way positions such that the screws 69 may be put in place.

As above pointed out, the valve blocks 62 and 63 are mounted, respectively, on the front and the side of the cylinder block 60, and the blocks 62 and 63 are utilized in the forming passages for the hydraulic fluid, and valve means are provided on these blocks and in association with such passages for controlling the flow of hydraulic fluid through the passages and to and from the cylinder 60C.

The hydraulic unit H embodies a plurality of passages and valves whereby the flow of hydraulic liquid to and from the upper and lower ends of the cylinder 60C may be controlled, and the system of passages and valves forms a part of a complete hydraulic system that is shown diagrammatically in FIG. 7, and in its physical form in FIG. 1. Thus, the hydraulic supply unit 70 comprises a hollow base 71 that provides a sump for containing a supply of hydraulic liquid, and on top of the base 71 a motor 72 is positioned which drives a pump 73. The supply unit 70 may of course be disposed in any convenient remote location, and as shown herein, is mounted on the base 21 partially behind the column 22. As shown diagrammatically in FIG. 7A, the pump 73 has an inlet connection 74 and a discharge to a pressure relief valve 75 which, when opened due to excessive pressure, returns the hydraulic liquid through lines 76 and 76A to the sump provided within the base 71. Normally, the pressure liquid passes through the valve 75 to a pressure supply connection 77 which is extended as flexible hose to the hydraulic unit H, as shown in FIG. 1. A similar return or exhaust connection 78 extends from the hydraulict unit H back to a point of connection with the pipe 76 so that the exhaust fluid is returned to the sump of the hydraulic unit 70.

The front valve block 62 has a pair of rate control valves mounted therein, and the first of these is a rapid feed valve 81 and the second is a feed rate valve 82 which is in the nature of a needle valve. The rapid feed valve 81 is shown in detail in FIG. 7B of the drawings and is provided by forming a stepped bore 81B that extends into the forward face of the block 62. Within this stepped bore a valve member 81V is provided for rotation by an external valve handle 81H, the operating stem of which is sealed by a packing nut 81P. The inlet for the valve 81 is provided by a horizontal bore 77E that opens into the bore 81B radially thereof, while the outlet is provided by a bore 77F that is coaxial with the bore 81B and extends for a short distance from the bottom of the bore 81B for connection with the other passages as will be described. The valve member has an angular valve passage 181 formed therein which in one rotative position of the valve member 81V serves to connect the passages 77E and 77F, while in all other rotative positions of the valve member 81V, the connection between these two passages is closed. When the valve member or handle 81H is in the position shown in FIG. 9 of the drawings, a radial operating arm 81A thereof engages a pin 81S to locate the valve member 81V in its open position of FIG. 7B. A similar pin 81S limits movement of the valve member in the other direction.

The needle valve 82 is shown in detail in FIG. 7C of the drawings and is formed by providing a stepped bore 82B that extends rearwardly through the front face of the valve block 62, and an inner tapered portion 82T of this bore is intersected by a horizontal inlet passage 77J. The outlet passage is provided by a bore 77K that is coaxial with the bore 82B, and the bore 77K has a tapered portion 82T which forms a valve seat. The valve 82 has a tapered valve member 82V that has a screw threaded portion 82S engaging a threaded portion of the bore 82B so that by rotation of a valve handle 82H on the outer end of the valve member, this valve member may be moved toward and away from its tapered seat 82T, thus to operate with a needle valve action and enabling the effective area of the valve to be adjusted to attain any desired rate of flow of the hydraulic liquid therethrough.

The valve block 63 has a main control valve 85 provided on the left side thereof as viewed in FIGS. 1 and 9, and this valve 85 is operated between its various control positions by the manually operable handle 133. Thus, as shown in FIGS. 3 and 9, the side of the block 63 has a relatively large bore 85B formed therein so as to have a flat bottom surface at right angles to the axis of the bore. The bore 85B has a disk-like valve member 85V rotatably positioned therein and the valve member is of a thickness substantially less than the depth of the bore 85B so as to provide an inlet chamber within the bore 85B between the valve member 85V and a closure plate 85P. The closure plate 85P is held in position by a plurality of cap screws 85S, and a valve operating stem 85X extends through the plate 85P in a sealed relation and engages a transverse groove 85G formed in the adjacent surface of the valve member 85V. A spring 85Y, FIG. 3, surrounds the stem 85X and acts between the plate 85P and the adjacent surface of the valve member 85V to hold the valve member against the flat bottom surface of the bore 85B. On the outer end of the valve operating shaft 85X an operating head 85Z and the handle 133 extends radially from the operating head. The operating head 85Z is provided with a spring detent 85D for holding the valve 85V in any one of its three control positions as will hereinafter be described.

The location of the valve member 85V in any selected one of its three positions controls the flow of hydraulic liquid in the hydraulic unit H, and when the handle 133 is in its upper position, the hydraulic liquid that has entered the unit H from the supply connection 77 is fed to the lower end of the cylinder 60C while the fluid from the upper end of the cylinder 60C is directed to the exhaust connection 78. When the handle 133 is in its lower portion shown in FIG. 11, these supply and exhaust connections are reversed. Finally, when the handle 133 is located in its neutral position midway between the two positions just described, the upper and lower ends of the cylinder 60C are connected to each other and to the exhaust connection 78.

The valve 85 has the portion of the bore that is outwardly of the valve member 85V supplied with hydraulic liquid under pressure and this is accomplished through a system of interconnected bores formed in the blocks 62 and 63. As will be evident in FIG. 9, the inlet or supply line 77 is connected to a horizontal bore 77A that extends inwardly or forwardly from the rear face of the block 63, and the bore 77A intersects with a bore 77B that is extended horizontally into the block 63 from the right hand face thereof. The bore 77B is aligned with a bore 77C formed from and extended through the left hand face of the block 62 and to a point of intersection with a passage 77D which is formed as a vertical bore extended downwardly from or through the upper face of the block 62. The upper end of the bore 77D is closed by a plug P–1. It will be recalled that bores 77B and 77C are aligned, and the meeting ends are gasketed by a gasket G–1 between the blocks 62 and 63. The vertical passage 77D intersects with the valve inlet passages 77E and 77J that are formed as horizontal bores extended into the right hand side of the block 62, these bores being extended into the bores 81B and 82B, respectively, of the rate control valves. The right hand ends of the bores 77E and 77J are closed by plugs P–2 and P–3.

The outlet passage or bore 77F of the valve 81 is arranged to intersect with a horizontal bore 77G that is extended inwardly through the left hand face of the block 62 at a point where this bore is opposite the right hand face of the block 62, and a gasket G–2 closes the left hand or outer end of the bore 77G. Similarly, the outlet bore 77K of the valve 82 intersects a horizontal bore 77L that is extended into the left hand face of the block 62 in the same vertical plane as the bore 77G, and both of the bores 77G and 77L are intersected by a vertical bore 77H that extends downwardly from the upper face of the block 62. The upper end of the bore 77H is closed by a plug P–4. The bore 77L is aligned with a horizontal bore 77M that is extended into the right hand face of the block 63, and the meeting ends of the bores 77L and 77M are sealed by a gasket G–3. The bore 77M intersects a horizontal bore 77N that is extended forwardly through the rear face of the block 63, this bore 77N intersecting the bore 85B of the valve 85 outwardly or to the left of the outer face of the valve member 85V. The rear end of the passage 77N is closed by a plug P–5.

With the system of interconnected bores that has thus been described, the hydraulic liquid under pressure is transmitted to the inlet sides of both of the rate control valves 81 and 82, and may be transmitted through either or both of these valves to the inlet chamber of the direction control valve 85, as will be evident in FIGS. 7A and 9.

The exhaust passages from the valve 85 are also provided by a system of interconnected bores, the first of which is a horizontal bore 78A extended forwardly through the rear surfaces of the block 63, and it is to the rear or open end of this bore that the exhaust hose 78 is connected. The bore 78A is intersected by a vertical bore 78B that is extended downwardly through the upper surface of the block 63, and the upper end of the bore 78B being closed by a plug P–6. The lower end of the bore 78B intersects a horizontal bore 78C that is extended forwardly through the rear surfaces of the block 63, and the rear end of the bore 78C is closed by a plug P–7. The other or closed forward end of the bore 78C is intersected by a horizontal bore 78D that is extended from the flat bottom of the bore 85B in the position that is shown in FIGS. 9A and 10.

The passages that are required to connect the upper and lower ends of cylinder 60C with the valve 85 are also provided by a system of related bores formed in the blocks 60 and 63 and the form of relationship of these bores is illustrated in FIG. 9 of the drawings. Thus, a bore 87A is extended horizontally into the left hand side of the block 60 so as to enter the cylinder 60C near the upper end thereof, and this bore is aligned with a bore 87B that is extended horizontally into the right hand side of the block 63. The meeting ends of the bores 87A and 87B are sealed by a gasket G–4. The inner or left hand end of the bore 87B intersects with a vertical bore 87C that is extended downwardly through the upper surface of the block 63, the upper end of this bore being closed by a plug P–8. At its lower end, the bore 87C is intersected by a horizontal bore 87D that is extended to the right through the bottom of the bore 85B in the position shown particularly in FIG. 9A of the drawings.

The passage to the lower end of the cylinder 60C is provided by a bore 88A that is extended horizontally through the left hand face of the block 60 so as to enter the cylinder 60C near the rear end thereof, and this bore is aligned with a horizontal bore 88B that is extended into the right hand face of the block 63, the meeting ends of these bores being sealed by a gasket G–5. The bore 88B intersects the upper end of a vertical bore 88C that is extended upwardly into the lower surface of the block 63, and the lower end of the bore 88C is closed by a plug P–9. At its upper end, the bore 88C intersects a horizontal bore 88U that is extended from the bottom of the bore 85B in the position shown in FIG. 9A of the drawings.

It has been pointed out hereinabove that when the valve member 85V is in the position shown in FIG. 10, the hydraulic connections are such as to cause the piston 60P to move upwardly, and to accomplish this, the pressure chamber of the valve 85 is connected with the passage 88U. Therefore, the valve member 85D is in its "up" position, the bore 91U will be aligned with the bore 88U and the passage 88C. The pressure liquid thus passes through the bore 91U and the several passages 88 to the lower end of the cylinder 60C, thus to raise the quill 34. As this occurs, the upper end of the cylinder 60C must of course be connected with the exhaust line 78, and this will be described hereinafter.

When the valve member 85V is in its "down" position of FIG. 11, the valve bore 91U is moved out of alignment with the bore 88U and is located opposite a closed portion of the bottom surface of the bore 85B, as will be evident in FIGS. 9A and 11. The valve member 85V, however, has another pressure transmitting bore 91D which at this time is located in a position of alignment with respect to the passage 87D so that pressure liquid will be transmitted from the inlet chamber of the valve 85V through the bore 91D and through the several related passages 87 to the upper end of the cylinder 60C. This causes the piston 60P to be actuated in a downward direction to correspondingly actuate the quill 34.

In providing for connection of the opposite ends of the cylinder 60C in each instance to the exhaust line 78, the inner or right hand face of the valve member 85V has a rather complex recess formed therein which establishes the required exhaust connections in the "up" and "down" positions of the valve 85V and which also serves to interconnect the upper and lower ends of the cylinder 60C to each other and with the exhaust when the valve member 85V is in its other or neutral position. Thus the rear face of the valve member 85V has a passage or recess 92 formed therein and this recess comprises a diametric portion 92A with arcuate lateral extensions 92B and 92C at its opposite ends. When the valve member 85V is in the "up" position of FIG. 10, one end of the arcuate extension 92B of the groove 92 is disposed opposite the bore 87D, and while the opposite end of the arcuate portion 92C is disposed opposite the exhaust passage 78D, and the hydraulic liquid from the upper end of the cylinder 60C may thus pass through the groove 92 to the exhaust of the system.

When the valve member 85V is in its "down" position of FIG. 11, the other end of the arcuate extension 92B is disposed opposite the passage 88U, while the opposite end of the arcuate extension 92C is disposed over and in alignment with the exhaust passage 78D. Thus, in this setting of the valve, the lower end of the cylinder 60C is in communication with the exhaust passage 78D.

In the intermediate or neutral position of the valve member 85V, the mid-portion of the arcuate section 92C is disposed opposite the exhaust passage 78D, while the respective ends of the arcuate section 92B of the groove are located opposite the two passages 87D and 88U, thus to interconnect the upper and lower ends of the cylinder C with each other and with the exhaust passage 78D. When the valve 85V is thus set in its neutral position, the quill 34 may be actuated "up" and "down" by the manual handle 33, and the necessary flow of hydraulic liquid from one or the other of the ends of the cylinder 60C may take place as required.

From the foregoing description it will be apparent that the present invention enables a conventional machine to be in effect converted readily and easily for hydraulic actuation of the quill, and it will also be apparent that under the present invention the conversion to hydraulic actuation of the quill does not in any way disable the usual manual feeding or adjusting means that are provided in association with such a quill.

It will also be apparent that the present invention provides hydraulic quill actuating mechanism for machine tools where the hydraulic system consists of two basic units that may be readily and easily associated with a conventional machine tool so as to provide for hydraulic actuation and control of the quill. Furthermore, it will be apparent that this invention enables the hydraulic actuating means or the usual manual actuating means to be used more or less interchangeably as may be required by the work that is to be performed.

Thus, while we have illustrated and described a preferred embodiment of my invention it is to be understood that changes and variations may be made by those skilled in the art without departing from the spirit and scope of the appending claims.

We claim:

1. A hydraulic actuating and control unit for machine tools comprising a cylinder block having a cylinder with a reciprocable piston therein, a mounting block rigidly secured to one face of said block and having a rotatable shaft mounted therein transversely of said cylinder, a pinion on said shaft, a rack meshed with said pinion and guided for movement parallel to said cylinder, means connecting said rack to said piston for actuation thereby, a front valve block fixed to opposite side of said cylinder block and having manually operable rate control valve means mounted therein with operating means for the rate control valve means accessible on the exterior of the valve block, a side valve block rigidly secured to another side of said cylinder block and overlapping and abutting a corresponding side of said front valve block, said side valve block having a manually operable direction control valve mounted therein with handle means exposed exteriorly of the side valve block, a series of interconnected bores formed in said side valve block forming an exhaust passage from said direction valve, a series of interconnected bores formed in cooperating relation in the three blocks and forming a pressure liquid passage through said side valve block, through said front valve block and said rate control valve means to said direction control valve, and passage means formed as a plurality of cooperating bores in said side valve block and said cylinder block for conducting liquid to and from the direction control valve to the respective ends of the cylinder under control of the direction control valve.

2. A hydraulic actuating and control unit for machine tools comprising a cylinder block having a cylinder with a reciprocable piston therein, a mounting block rigidly secured to one face of said block and having a rotatable shaft mounted therein transversely of said cylinder, means operatively connecting said pinion to said piston for actuation thereby, a front valve block fixed to opposite side of said cylinder block and having manually operable rate control valve means mounted therein with operating means for the rate control valve means accessible on the exterior of the valve block, a side valve block rigidly secured to another side of said cylinder block and overlapping a corresponding side of said front valve block, said side valve block having a manually operable direction control valve mounted therein with a handle means exposed exteriorly of the side valve block, a series of interconnected bores formed in said side valve block forming an exhaust passage from said direction valve, a pressure liquid passage comprising a series of interconnected bores formed in cooperating relation in the three blocks and forming a pressure liquid passage through said side valve block, through said front valve block and said rate control valve means to said direction control valve, and passage means formed as cooperating bores in said side valve block and said cylinder block for conducting liquid to and from the direction control valve to the respective ends of the cylinder under control of the control valve.

3. A hydraulic actuating and control unit for association with a quill of a machine tool, said unit comprising a housing adapted to be mounted on a machine tool adjacent a quill operating shaft, a stub shaft mounted in said housing, means on one end of the stub shaft for driving connection thereof to a quill operating shaft, reversible hydraulic driving means in said housing for driving said stub shaft, and manually variable rate and direction control valve assemblies for said driving means carried on said housing, said rate valve assembly comprising first and second valve mechanisms arranged in parallel with each other so as to be capable of independent communication with said hydraulic driving means, said first valve mechanism being manually adjustable to provide for desired rate of feed of said hydraulic driving means and said second valve mechanism being capable of independent adjustment so as to at times override the rate of feed determined by said first valve mechanism by providing substantially increased rate of traverse of said hydraulic driving means.

4. In a hydraulic actuating and control unit for association with an element of a machine tool; a hydraulic valve assembly comprising a cylindrical chamber including a generally closed end and an open end adapted to slidably receive a rotatable valve body therein; a plurality of conduit means having ends thereof terminating in said generally closed end of said chamber; a plurality of passages formed in said valve body so as to have at least some portion thereof in a generally axial direction with respect to the centerline of said valve body and adapted through rotative motion of said valve body to be at times placed in communication with said plurality of conduit means; a cover plate for closing said open end of said cylindrical chamber including an aperture therein for the reception of a rotatable driving member therethrough; said driving member being formed so as to be of generally cylindrical form having one end thereof extending externally of said cover plate while having its other end provided with flat driving surfaces formed generally parallel to the centerline of said driving member; and slot means of a length longer than the width of said flat surfaces formed in said valve body for the reception of said flat driving surfaces; said flat surfaces and slot forming a lost-motion coupling for cancellation of any eccentricities between said aperture, cylindrical chamber, valve body and driving member.

5. An actuating and control unit for machine tools comprising a housing; a first cylindrical chamber formed in said housing adapted to slidably receive a pressure responsive piston member therein; a variably positioned main control valve; first, second, and third conduit portions formed in said main control valve; a second cylindrical chamber formed so as to be in continuous communication with said first and second conduit portions; fourth conduit means communicating between a source of relatively high pressure fluid and said second cylindrical chamber; manually variable restriction means serially connected in said fourth conduit means at a point between said source of relatively high pressure fluid and said second cylindrical chamber; fifth conduit means in communication with said fourth conduit means bypassing said manually variable restriction means; manually positioned valve means serially connected in said fifth conduit means for controlling the flow of relatively high pressure fluid therethrough; sixth conduit means communicating at its one end with a source of relatively low pressure fluid; seventh conduit means communicating at its one end with said first cylindrical chamber near one end thereof; eighth conduit means communicating at its one end with said first cylindrical chamber near the other end thereof; said first, second, and third conduit portions being so formed and located as to cause said second conduit portion to complete communication between said second chamber and said eighth conduit means while said third conduit completes communication between said sixth and seventh conduit means in one extreme position of said main control valve, while in the other extreme position of said main control valve having said first conduit portion completing communication between said second chamber and said seventh conduit means and said third conduit portion completing communication between said sixth and eighth conduit means.

6. An actuating and control unit for machine tools comprising a housing, a first cylindrical chamber formed in said housing adapted to slidably receive a pressure responsive piston member therein; a variably positioned main control valve; first, second and third conduit portions formed in said main control valve; a second cylindrical chamber formed so as to be in continuous communication with said first and second conduit portions; fourth conduit means communicating between a source of relatively high pressure fluid and said second cylindrical chamber; manually variable restriction means serially connected in said fourth conduit means at a point between said source of relatively high pressure fluid and said second cylindrical chamber; fifth conduit means in communication with said fourth conduit means bypassing said manually variable restriction means; manually positioned valve means serially connected in said fifth conduit means for controlling the flow of relatively high pressure fluid therethrough; sixth conduit means communicating at its one end with a source of relatively low pressure fluid; seventh conduit means communicating at its one end with said first cylindrical chamber near one end thereof; eighth conduit means communicating at its one end with said first cylindrical chamber near the other end thereof; said first, second and third conduit portions being so formed and located so as to cause said second conduit portion to complete communication between said second chamber and said eighth conduit means while said third conduit portion completes communication between said sixth and seventh conduit means in one extreme position of said main control valve, while in the other extreme position of said main control valve having said first conduit portion completing communication between said second chamber and said seventh conduit means and said third conduit portion completing communication between said sixth and eighth conduit means and an intermediate position of said main control valve wherein said third conduit portion completes communication among said sixth, seventh and eighth conduit means while all communication through said first and second conduit portions is terminated.

7. An actuating and control unit for machine tools comprising a housing; a first cylindrical chamber formed in said housing adapted to slidably receive a pressure responsive piston member therein; a variably positioned rotatable main control valve; first, second and third conduit portions formed in said main control valve; said first and second conduit portions being formed in a direction generally parallel to the centerline of said main control valve; said third conduit portion being formed in a direction generally radial of the centerline of said main control valve; a second cylindrical chamber formed so as to be in continuous communication with said first and second conduit portions; fourth conduit means communicating between a source of relatively high pressure fluid and said second cylindrical chamber; manually variable restriction means serially connected in said fourth conduit means at a point between said source of relatively high pressure fluid and said second cylindrical chamber; fifth conduit means in communication with said fourth conduit means bypassing said manually variable restriction means; manually positioned valve means serially connected in said fifth conduit means for controlling flow of relatively high pressure fluid therethrough; sixth conduit means communicating at its one end with a source of relatively low pressure fluid; seventh conduit means communicating at its one end with said first cylindrical chamber near one end thereof; eighth conduit means communicating at its one end with said first cylindrical chamber near its other end thereof; said first, second and third conduit portions being so formed and located so as to cause said second conduit portion to complete communication between said second chamber and said eighth conduit means while said third conduit portion completes communication between said sixth and seventh conduit means in one extreme position of said main control valve, while in the other extreme position of said main control valve having said first conduit portion completing communication between said second chamber and said seventh conduit means and said third conduit portion completing communication between said sixth and eighth conduit means.

References Cited in the file of this patent

UNITED STATES PATENTS

| | | |
|---|---|---|
| 1,813,040 | Ferris | July 7, 1931 |
| 1,888,091 | Oberhoffken | Nov. 15, 1932 |
| 2,444,228 | Huthsing | June 29, 1948 |
| 2,603,065 | Sarto | July 15, 1952 |
| 2,652,732 | Frye | Sept. 22, 1953 |
| 2,674,138 | Mize | Apr. 6, 1954 |
| 2,821,964 | Tydeman | Feb. 4, 1958 |
| 2,846,903 | Pleger | Aug. 12, 1958 |
| 2,854,957 | Svingor et al. | Oct. 7, 1958 |